United States Patent

[11] 3,610,373

[72] Inventor Richard T. Burnett
 South Bend, Ind.
[21] Appl. No. 863,481
[22] Filed Oct. 3, 1969
[45] Patented Oct. 5, 1971
[73] Assignee The Bendix Corporation

[54] ADJUSTER MECHANISM FOR DISC BRAKES
 8 Claims, 4 Drawing Figs.
[52] U.S. Cl. .................................................. 188/71.9,
 188/196 D
[51] Int. Cl. .................................................. F16d 55/18,
 F16d 65/56
[50] Field of Search ...................................... 188/71.7–71.9,
 196 A, 196 B, 196 C, 79.5 GE

[56] References Cited
 UNITED STATES PATENTS
 3,442,357  5/1969  Farr .............................. 188/196 (PRR)
 3,482,657  12/1969  Zeitrager ..................... 188/71.7

Primary Examiner—Duane A. Reger
Attorneys—C. F. Arens and Plante, Arens, Hartz, Hix and Smith ABSTRACT: A caliper disc brake assembly includes an adjuster mechanism for maintaining the proper clearance between the brake shoes and the disc. The adjuster is actuated by relative movement between it and the piston and is mounted on a member that reciprocates with the piston during high pressure brake applications thus precluding adjustment, but is held stationary during low pressure applications to permit operation of the adjuster. Over-adjustment due to "panic stops" is thereby prevented. Such an adjuster is particularly useful when mechanical actuation is provided in addition to the usual hydraulic actuation.

INVENTOR.
RICHARD T. BURNETT

3,610,373

ADJUSTER MECHANISM FOR DISC BRAKES

BACKGROUND OF THE INVENTION

This invention relates to an automatic adjuster mechanism for caliper disc brakes.

Due to wear of the friction pads, a recurrent problem in modern disc brakes is maintaining the proper gap between the brake shoes and the rotor when the brakes are released. For this reason, many modern disc brakes have adjustment devices incorporated therein to automatically maintain the required clearance. Such devices have oftentimes been troublesome to service, due to the numerous springs, detents, racks, pinions, etc., that have been necessary in former designs. Also such designs did not permit fine adjustment of the clearance width.

Another troublesome problem with disc brake adjusters is their tendency to overadjust when the brakes are applied suddenly in "panic-stop" situations. When high pressure is abruptly applied to the brakes, the piston movement is greater than normal because of higher elastic deflections of the brake members, often resulting in overadjustment of the brake. In prior art devices, unless large retraction movement is provided in the adjuster, the shoes will sometimes drag against the disc after an overadjustment caused by a panic stop, thus causing the shoes to wear quickly. If larger retraction is provided for, more travel of the actuating mechanism results. It is therefore desirable to limit operation of the adjustment mechanism to relatively low pressure levels.

SUMMARY OF THE INVENTION

Therefore, an important object of the present invention is to provide a disc brake self-adjuster that continuously adjusts for lining wear.

Another important object of the present invention is to furnish a self-adjuster having considerably fewer parts than other similar devices.

Yet another important object of my invention is to prevent operation of the adjuster mechanism when pressures in excess of a predetermined level are developed in the brake as a result of, for example, a panic stop.

BRIEF DESCRIPTION OF THE DRAWINGS

FIG. 4 is an enlarged fragmentary, cross-sectional detail view of a portion of FIG. 3 but illustrating the piston in its retracted position.

DETAILED DESCRIPTION

Figure 1:
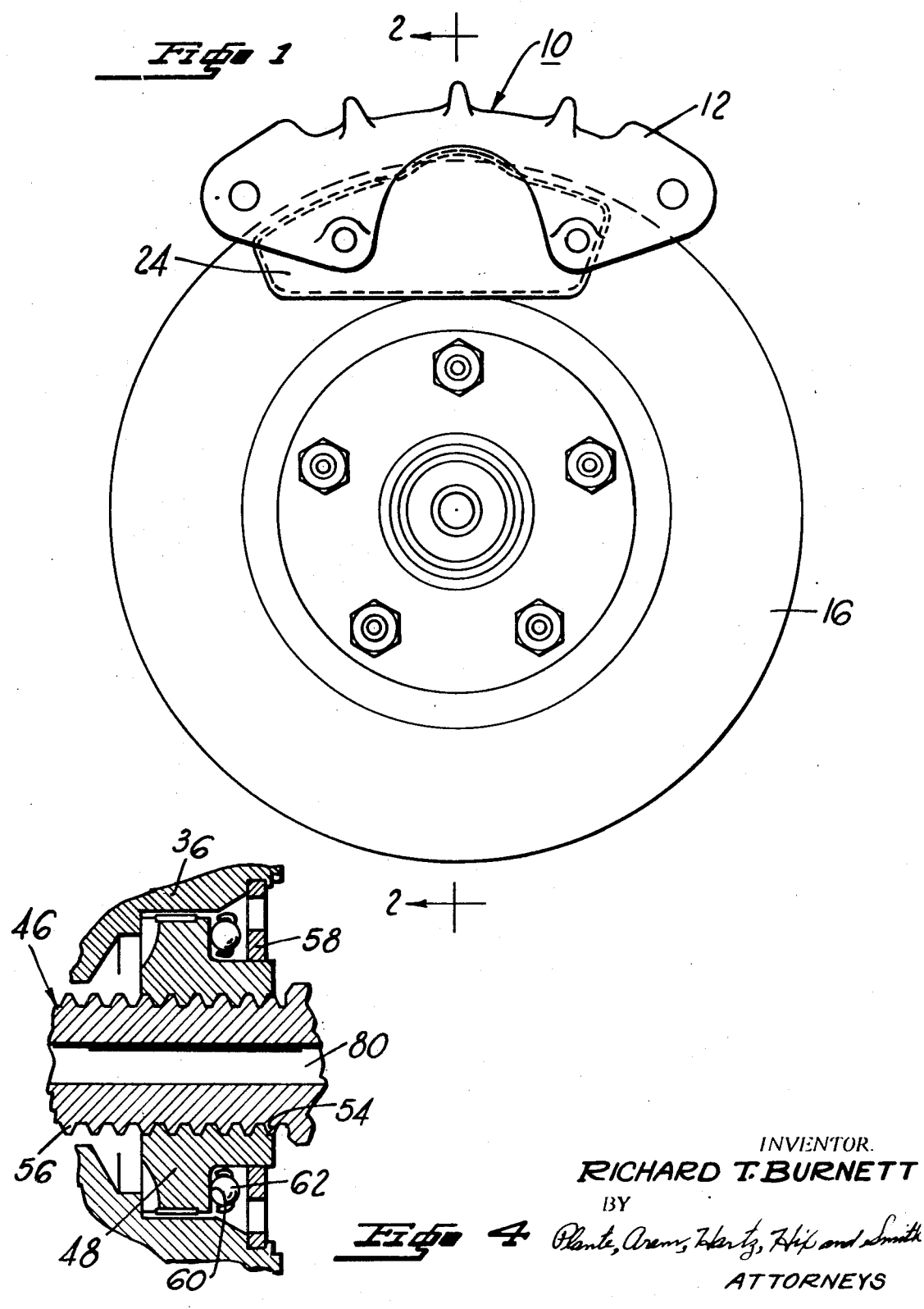
FIG. 1 is a front plan view of a disc brake made pursuant to my present invention.
Figure 2:
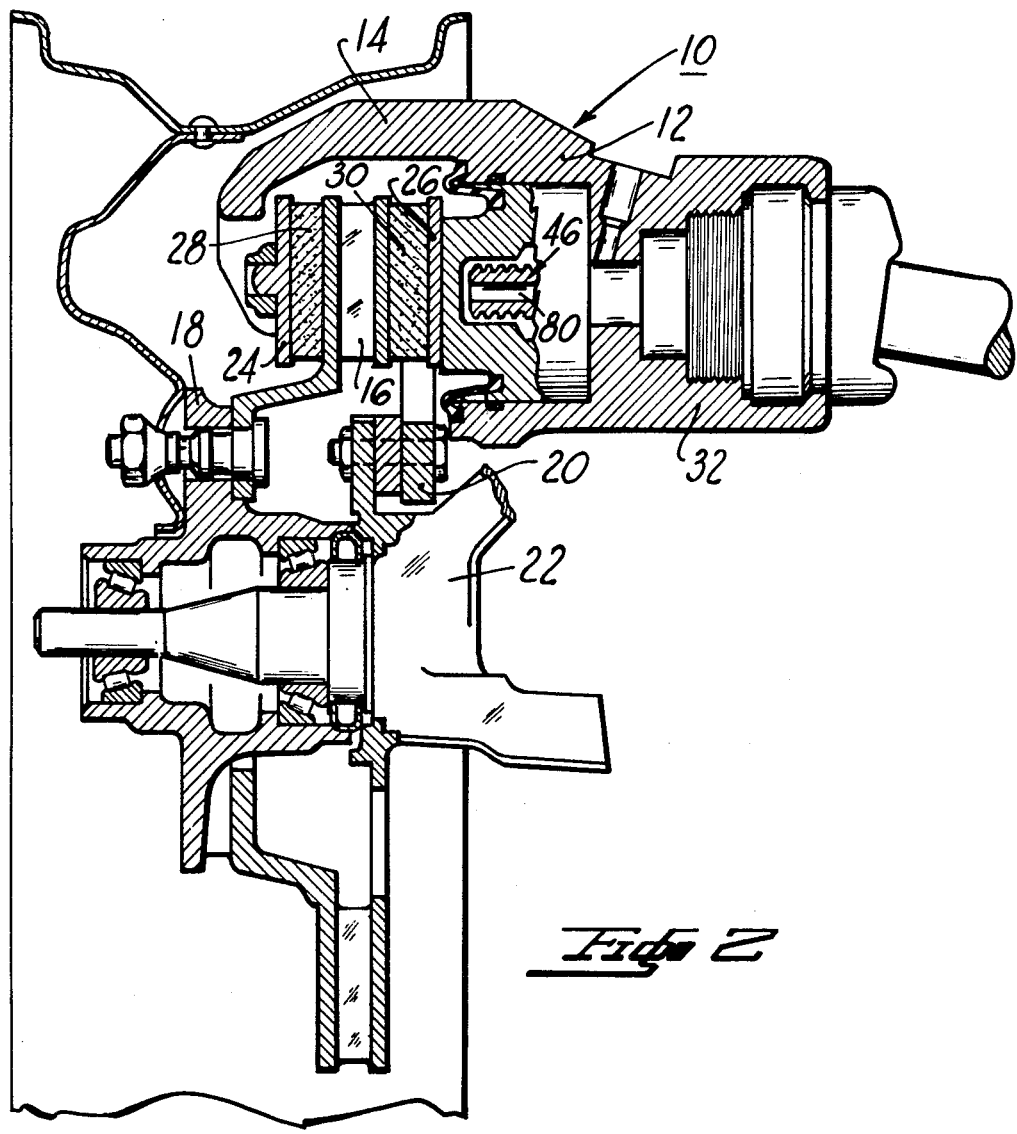
FIG. 2 is an enlarged, fragmentary, cross-sectional view taken along line 2—2 of FIG. 1 showing the brake shoes applied to the disc.

Referring now to the drawings, a disc brake assembly 10 includes a caliper 12 having a bridge piece 14 that straddles a rotatable disc 16. The disc 16 is bolted to a vehicle wheel 18 for rotation therewith. A torque member 20, secured to a fixed part of the vehicle such as a spindle housing 22 supports the caliper 12 for longitudinal sliding motion with respect to the disc 16. A pair of opposed brake shoes 24, 26, are provided on opposite sides of the disc 16 and have friction pads 28, 30, for engagement with the disc 16 for stopping the vehicle (not shown). The mounting of the caliper on the torque member is more fully explained in U.S. Pat. No. 3,388,774 assigned to the assignee of the present invention.

Caliper 12 includes a housing 32 defining a chamber 34 therewithin which slidably receives a piston 36 for urging the shoes 24, 26 into engagement with the disc 16 to stop the vehicle. A conduit 38 admits fluid pressure into the chamber 34 to act against a rear face 40 of the piston 36. The usual seal 42 is provided between the piston 36 and housing 38 to prevent fluid from escaping therefrom. A resilient boot 44 is provided interconnecting the piston 36 and housing 38 to prevent foreign material from interfering with the operation of the piston.

After a number of brake applications, wear of the friction pads 28, 30 due to their contact with the disc 16 enlarges the clearance between the pad and the disc when the brakes are released. To maintain this clearance distance constant, adjuster mechanism 46 is provided. Mechanism 46 includes a nut 48 rotatable on a post portion 50 of an elongated member 52 coaxial with the piston 36. Complementary screw threads 54, 56 on the nut 48 and the post 50 respectively are of the type that permit the nut 48 to rotate and therefore advance with the piston 36 when a force acting parallel to the axis of the member 52 in the direction of the arrow 49 is applied to the nut 48 through an antifriction bearing 62 by the washer 58 carried by the piston 36 during movement of the piston toward the rotor 16. However, if a similar force acting in the opposite direction acts on the nut 48 at the shoulder 64 during return movement of the piston, the threads lock to prevent backward movement of the nut. Applicant has discovered that threads having a helix angle in the range of substantially 18°–21° are satisfactory for this purpose. Forward movement of the piston 36 thus engages the washer 58 with the antifriction means 62 which engages a shoulder 60 on the nut 48, thus causing the nut 48 to turn.

The housing 32 includes the chamber 34 housing the piston 36 and the adjuster mechanism 46, a compartment 68, and a bore 70 interconnecting The chamber 34 with the compartment 68. Bore 70 supports the post section 50 for axial movement therein. Member 52 includes a base portion 72 which is counterbored to accommodate a seat element 74. Base portion 72 further includes a surface 78 against which fluid pressure acts. The seat element 74 is formed with a flange 75 which abuts the end of the base portion 72 to thereby provide a space 76 between said counterface of the base portion and said seat element. Face 78 has transverse surface area substantially greater than the transverse cross-sectional area of the post portion 50. A fluid channel 80 in the post 30 communicates the space 76 with the chamber 34 and with the fluid inlet conduit 38.

A yieldable member or spring 84 is interposed between a shoulder 86 formed on the base portion 72 and a shoulder 88 on the housing 36. Appropriate seals 90 are provided between the base portion 72 and the seat 74 to prevent fluid from escaping therebetween.

A mechanical actuator 92 is provided for use as a parking brake. The parking actuator 92 includes a handle 94 pivotally mounted in the compartment 68 and a toggle 96 interconnecting the handle 94 and the seat 74. Movement of the handle 94 forces the seat 74, the member 52, and the piston 36 forward to apply the brake shoes. Details of the construction and operation of the parking brake 92 are fully described in copending application, Ser. No. BRS-68- 31 , owned by the assignee of the present invention and incorporated herein by reference as need be for a more complete understanding of the instant invention.

MODE OF OPERATION

In normal operation, the vehicle operator depresses the brake pedal which causes fluid to flow through the conduit 38 and act upon the rear face 40 of the piston 36, forcing the latter toward the disc 16. Movement of the piston 36 engages friction pad 30 with disc 16, and those skilled in the art will recognize that reaction forces acting through the caliper 12 will also engage the pad 18 with the disc 16, thus stopping the vehicle.

Figure 3:
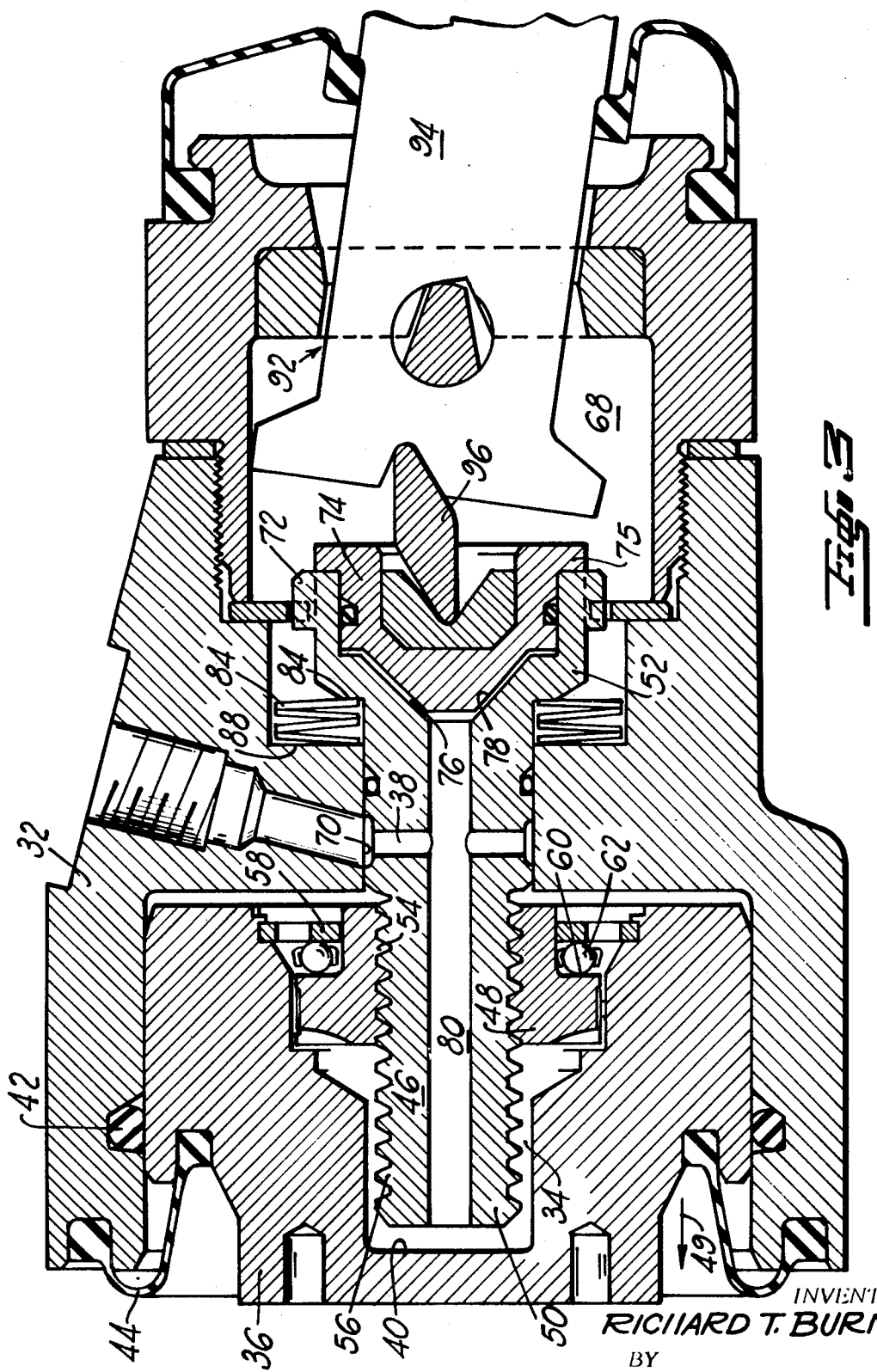
FIG. 3 is an enlarged, fragmentary, cross-sectioned detail view of the device shown in FIGS. 1 and 2, illustrating details of the device with the piston in its extended position.

Adjuster mechanism 46 initially is positioned on the post 50 so that when the brakes are fully applied, the piston travel will be such that the washer 58 will contact the bearing 62, as illustrated in Figure 3. Release of the brakes causes resilient seals 42 to move the piston 36 away from the disc until face 40 contacts face 64 of nut 48. Of course, when the brakes are released, there will be a clearance between the washer 58 and the bearing 62 as illustrated in Figure 4.

The brake release position illustrated in FIG. 4, the shoulder 64 on the nut 48 engages the rear face of the piston 36, and the washer 58 is spaced from the bearing 62.

Each brake application results in some material being worn from the pads 28, 30. After repeated applications, enough material will be worn from the pads 28, 30 to increase the clearance between the pads and the brake when the brakes are released unless the stroke of the piston 36 is adjusted to maintain the clearance constant. This function is performed by the mechanism 46. As the friction pads 28, 30 wear, the increased distance the piston 36 must travel results in application of a force acting in the direction of arrow 49 by the washer 58 through the bearing 62 to the nut 48. Due to the design of the threads 54, 56, the force causes the nut to turn relative to the washer 58, forcing it toward the disc 16. Upon release of the brakes, piston 36 moves away from the disc 16 until face 40 contacts face 64 of the nut, thus stopping movement of the piston 36. Since washer 58 is carried by the piston, nut 48 is always advanced the proper amount to assure the correct clearance between the disc 16 and the pads 28, 30.

At low levels of fluid pressure, the adjuster 46 operates as described above. Therefore, during a "panic stop," when the piston travel becomes much larger than normal due to the elastic deflection of the various brake parts caused by the high fluid pressure applied to the piston, further adjustment would normally take place, since the piston 36 would travel an abnormally greater distance toward the rotor 16, thereby causing the washer 58 to advance the nut 48 toward the rotor 16 a greater distance than would be required due to wear of the friction elements. Prior art brakes compensate for this condition by providing a brake in which the piston retracts a greater distance to avoid drag of the friction elements against the rotor when the brake is released. However, this solution is undesirable since more applying stroke must be used in the parking brake mechanism and degree of adjustment will vary depending upon what pressures had previously been encountered.

This problem is eliminated in the present design, since the pressure in chamber 34 tending to move the piston 36 toward the rotor 16 is also communicated to the annular space 76 by the conduit 80. Fluid pressure in the space 76 acting against the face 78 on the post 50 tends to move the latter to the left viewing FIG. 3. At low pressure levels, the fluid force acting on the face 78 tending to move the post 50 to the left is overcome by the force of the spring 84 urging the post 50 toward the seat 74. At higher pressure levels, however, the pressure acting on the face 78 overcomes the force of the spring 74, thereby permitting the post 50 to move toward the left viewing FIG. 3 with the piston 34. Since the nut 48 and post member 50 move with the piston 34, the washer 58 cannot apply an axial force to the nut 48, since there is no relative movement between the nut 48 and the piston 36. Therefore, the nut 48 will not rotate on the post member 50 and will not advance toward the piston.

I claim:

1. In a disc brake:
a torque-taking member;
a rotor having a pair of friction faces;
a caliper slidably mounted on said torque-taking member bridging said rotor;
said caliper including a housing defining a chamber therewithin;
a piston slidable in said chamber;
a fluid pressure source communicating with the chamber to slide the piston;
a pair of friction elements operably connected to said housing;
one of said friction elements being disposed adjacent each of said friction faces and adapted to be forced against the latter upon movement of the piston and corresponding movement of the caliper;
an automatic adjuster operatively connected to said piston;
said piston being adapted to engage said adjuster upon movement of the piston toward the rotor;
said automatic adjuster being slidable in said chamber at pressures above a predetermined level to permit the adjuster means to follow the movement of the piston thereby preventing operation of the adjuster at pressures above a predetermined level to permit the adjuster means to follow the movement of the piston thereby preventing operation of the adjuster at pressures above said predetermined level;
structure slidable in said bore carrying said adjuster means;
resilient means yieldably biasing said structure against reciprocation thereby limiting movement of the structure to a pressure level in the chamber sufficient to overcome the bias of the resilient means;
said structure being an elongated member having a fluid pressure surface at one end thereof; and
a seat carried by said housing slidably receiving said member;
said seat cooperating with said surface to define a fluid pressure enclosure therebetween;
said enclosure being communicated with said fluid pressure source.

2. The invention of claim 1:
said mechanism being a nut rotatable on the post for movement with the piston; and
means operably connected to the piston for rotating the nut in response to the increased travel of the piston required by wear of the shoes to bring the latter into contact with the disc;
said nut being adapted to abuttingly engage said piston to prevent movement of the latter past the nut.

3. The invention of claim 2:
there being complementary threads on the nut and on the post;
said threads being of the type permitting the nut to rotate under application of force thereto acting in a direction parallel to the axis of the post;
said means being a washer and bearing carried by the piston engaging said nut to apply said force to the nut thereby rotating the latter.

4. The invention of claim 1:
said seat being mounted in a nonpressurized compartment carried by said housing;
said chamber and said compartment being interconnected by a bore of reduced diameter;
said member extending through said bore and being supported for sliding movement thereby.

5. The invention of claim 4:
said member having a post section and an enlarged base section at one end of the post section carrying said fluid pressure surface and presenting a shoulder with said post section;
said resilient means being disposed between said shoulder and a wall of said housing to yieldably bias the member toward the seat.

6. The invention of claim 5; and
a fluid channel extending through said member in a longitudinal direction to communicate the chamber with the enclosure.

7. In a disc brake:
a rotor having a pair of friction faces;
a pair of friction elements, one of said elements being disposed adjacent each of said friction faces;
a torque member mounted adjacent one of said friction faces;
a caliper slidably mounted on said torque member and straddling said rotor for urging said friction elements into braking engagement with their corresponding friction faces;
said caliper including a housing defining a bore therewithin, first piston means slidable in said bore, means communicating pressurized fluid into said bore to urge said first piston means in a brake-applying direction to urge said friction elements toward their corresponding friction faces, second piston means slidably mounted in said bore and responsive to the fluid pressure level within the latter for movement with said first piston means when the fluid pressure level in said bore exceeds a predetermined level but remaining substantially stationary in said bore when the fluid pressure level therein is below said predetermined level, adjuster means carried by said second piston means for limiting retraction of said first piston means when the brake is released, said adjuster means advancing toward said first piston means when a brake application is effected and movement of the first piston means relative to the adjuster means exceeds a predetermined amount.

8. The invention of claim 7; and resilient means yieldably resisting movement of said second piston means until the fluid pressure level in said bore attains said predetermined level.